United States Patent [19]

Richards et al.

[11] Patent Number: 5,570,719
[45] Date of Patent: Nov. 5, 1996

[54] BREAKAWAY HOSE COUPLING

[75] Inventors: Alton E. Richards; Walter M. Carow, both of Kingston, Tenn.

[73] Assignee: Richards Industries, Inc., Rockwood, Tenn.

[21] Appl. No.: 499,609

[22] Filed: Jul. 7, 1995

[51] Int. Cl.$^6$ ................................................ F16L 29/00
[52] U.S. Cl. ............................ 137/614.04; 285/134
[58] Field of Search .................... 285/1, 134, 136; 137/68.14, 614, 614.04

[56] References Cited

U.S. PATENT DOCUMENTS

| | | | |
|---|---|---|---|
| 2,397,265 | 1/1945 | Jacobsson et al. | 284/17 |
| 3,097,867 | 4/1961 | Saloum | 285/86 |
| 3,211,178 | 7/1961 | Kiszko | 137/614.04 |
| 3,435,848 | 3/1967 | Johnston | 137/614.04 |
| 4,402,533 | 4/1981 | Ortloff | 285/18 |
| 4,691,941 | 8/1985 | Rabuska | 285/1 |
| 4,763,683 | 9/1987 | Carmack | 137/68.1 |
| 4,779,638 | 10/1987 | Nitzberg | 137/68.1 |
| 4,791,961 | 3/1988 | Nitzberg | 137/614.04 |
| 4,800,913 | 6/1988 | Nitzberg | 137/68.1 |
| 4,827,960 | 7/1988 | Nitzberg | 137/68.1 |
| 4,827,961 | 10/1988 | Nitzberg | 137/68.1 |
| 4,905,733 | 1/1989 | Carow | 137/614.04 |
| 5,018,546 | 10/1990 | Carmack et al. | 137/68.1 |
| 5,209,262 | 5/1993 | Carow et al. | 137/614.04 |
| 5,365,973 | 11/1994 | Fink, Jr. et al. | 137/614.04 |
| 5,433,247 | 7/1995 | Guertin | 137/614.04 |

FOREIGN PATENT DOCUMENTS

| | | |
|---|---|---|
| 491000 | 4/1973 | U.S.S.R. |
| 1088640 | 10/1965 | United Kingdom . |

*Primary Examiner*—John C. Fox
*Attorney, Agent, or Firm*—Pitts & Brittian, P.C.

[57] ABSTRACT

A breakaway hose coupling for releasably joining two fuel dispensing devices in fluid communication, and for selectively disengaging such dispensing devices in response to a disengaging force in excess of a preselected value being exerted on the coupling. The coupling (10) includes a first valve assembly (12) for being secured on a first dispensing device and for selectively terminating the flow of fluid from such dispensing device when the coupling (10) is uncoupled. The coupling (10) further includes a second valve assembly (14), including an elbow (72) and swivel connecting mechanism (70), for being secured on a second dispensing device and for selectively terminating the flow of fuel from such dispensing device when the coupling is uncoupled. Further, vapor conduits (28, 28A, 28B) are provided to accommodate the flow of recaptured fuel vapor through the coupling (10). The coupling (10) also includes automatic disconnect means (16) for maintaining the first and second valve assemblies (12, 14) in an engaged position in the absence of disengaging force in excess of a preselected value being applied to the coupling, and for disengaging the first and second valve assemblies (12, 14) in response to disengaging force in excess of such preselected value being applied to the coupling (10), whereupon the first and second valve assemblies (12, 14) terminate the flow of fluid from their operatively associated dispensing device.

17 Claims, 3 Drawing Sheets

BREAKAWAY HOSE COUPLING

DESCRIPTION

1. Technical Field

This invention relates to a breakaway hose coupling for releasably joining two fuel dispensing devices in fluid communication, and for selectively disengaging such dispensing devices in response to a disengaging force in excess of a preselected value being exerted on the coupling. In this particular invention the coupling incorporates both fuel and fuel vapor passages therethrough and a swivel mechanism.

2. Background Art

Filling stations for dispensing gasoline and other fuels have long had a problem with vehicles pulling away from fuel dispensing pumps with the dispensing nozzle still inserted in the vehicle's tank, or with the nozzle or dispensing hose otherwise secured or hung on the vehicle. Such incidents usually result in damage to the dispensing pump and/or breakage of the dispensing hose, and repairing the resulting damage to the dispensing pump or hose can be very costly. Further, the fuel spillage which can result from such damage can create dangerous and possibly life threatening conditions. Attempts have been made to overcome this problem by installing two hoses joined by a breakaway hose coupling device between the dispensing pump and nozzle, with the coupling device being designed to disengage and seal the hose ends when pressure is exerted on the coupling as in the case where a vehicle pulls away from the pump with the nozzle or hose still attached. Certain devices of this type are disclosed in U.S. Pat. Nos. 5,018,546; 4,905,733; 4,827,960; 4,827,961; 4,800,913; 4,791,961; 4,779,638; 4,763,683; 4,691,941; 4,402,533; 3,435,848; 3,211,178; 3,097,867; and 2,397,265. Such devices are also disclosed in U.S.S.R. Patent No. 491000 and British Patent No. 1088640.

However, in certain jurisdictions the vapor which is displaced from a fuel tank during filling must be recovered in order to reduce atmospheric pollution, and this requirement has made the construction of an effective breakaway coupling more difficult. In this regard, with earlier balanced vapor recovery systems fuel dispensing hoses having a fuel passageway jacketed by a separate vapor passageway have been used, such that breakaway couplings incorporated into such systems have had to provide for flow through fluid communication of both fuel and recovered fuel vapor. An example of such a breakaway coupling is disclosed in U.S. Pat. No. 5,209,262 wherein the coupling has a centrally located fuel passageway surrounded by vapor passageways. However, in the newer vacuum assisted vapor recovery systems the dispensing hoses used have a centrally located vapor recovery passageway surrounded by the fuel passageway, therefor necessitating a breakaway which accommodates this different hose construction. Further, it is also desirable to incorporate a swivel mechanism into a breakaway coupling to allow the coupled hoses or dispensing devices to swivel with respect to one another on an axis which is inclined relative to the axis of the dispensing hose. However, accommodating both a fuel passageway and a centrally disposed vapor passageway become more difficult when the coupling incorporates a swivel mechanism.

Therefore, it is an object of the present invention to provide a breakaway hose coupling device for joining two fuel dispensing devices which incorporates both a fuel passageway and a vapor recovery passageway therethrough.

It is another object of the present invention to provide a breakaway hose coupling device for joining two fuel dispensing devices which incorporates a swivel mechanism.

Yet another object of the present invention is to provide a breakaway hose coupling device which disengages and terminates the flow of fluid from such dispensing devices in response to disengaging force in excess of a preselected value being exerted on the coupling, and which includes one valve housing which also terminates the flow of fuel vapor from the operatively associated dispensing device when the coupling disengages.

Still another object of the present invention is to provide a breakaway hose coupling which is light, compact and inexpensive to manufacture and maintain.

SUMMARY OF THE INVENTION

The present invention provides a breakaway hose coupling for releasably joining two fuel dispensing devices in fluid communication, and for selectively disengaging such dispensing devices in response to a disengaging force in excess of a preselected value being exerted on the coupling. The coupling includes a first and second valve housings for being placed in flow-through fluid communication with first and second dispensing device, respectively, with the valve housings being selectively engagable to establish fluid communication therebetween. Each of the valve housings is provided with a fuel passageway therethrough for being placed in fluid communication with the fuel passageway of the operatively associated dispensing device, and each is provided with a vapor passageway therethrough for being placed in fluid communication with the vapor recovery passageway of the operatively associated dispensing device.

The fuel passageway and the vapor passageway of each valve housing are substantially coaxially disposed, with the fuel passageway jacketing the vapor passageway. A first valve mechanism is mounted in the fuel passageway of the first valve housing for selectively terminating the flow of fuel through such fuel passageway when the valve housings disengage, and a further valve mechanism is mounted in the vapor passageway of the first valve housing for selectively terminating the flow of fuel vapor through such vapor passageway when the valve housings disengage. A second valve mechanism is mounted in the fuel passageway of the second valve housing for selectively terminating the flow of fuel through the fuel passageway of the second housing when the first and second valve housings disengage. An automatic disconnect mechanism is also provided for maintaining the first and second valve housings in an engaged position in absence of a disengaging force in excess of a preselected value, and for disengaging the first and second valve housings in response to a disengaging force in excess of such preselected value. Accordingly, when disengaging force in excess of a preselected value causes the first and second valve housings to disengage, the first and second valve mechanisms terminate the flow of fuel through the first and second valve housings, respectively, and the further valve mechanism terminates the flow of fuel vapor through the first valve housing.

In certain embodiments the breakaway hose coupling further includes an elbow for being placed in flow-through fluid communication with the second dispensing device, and includes a swivel connecting mechanism for pivotally securing the elbow to the second valve housing whereby the elbow selectively swivels with respect to the second valve housing. The elbow is provided with a fuel passageway therethrough for being placed in fluid communication with the second dispensing device and the fuel passageway of the second valve housing, and provided with a vapor passageway therethrough for being placed in fluid communication with the second dispensing device and the vapor passageway of the second valve housing, the fuel passageway of and vapor passageway of the elbow being substantially coaxially disposed, with the fuel passageway jacketing the vapor passageway.

BRIEF DESCRIPTION OF THE DRAWINGS

The above mentioned features of the invention will be more clearly understood from the following detailed description of the invention read together with the drawings in which.

BEST MODE FOR CARRYING OUT THE INVENTION

A breakaway hose coupling incorporating various features of the present invention is illustrated generally at 10 in the Figures. The coupling 10 is designed to accomplish the fluid-tight coupling of two fuel dispensing devices, such as two fuel communicating hoses, or a fuel communicating hose and a fuel dispensing pump or nozzle. The coupling 10 is designed to breakaway or disengage upon separation force in excess of a preselected value being applied against the dispensing devices to which the coupling 10 is engaged.

Figure 1:
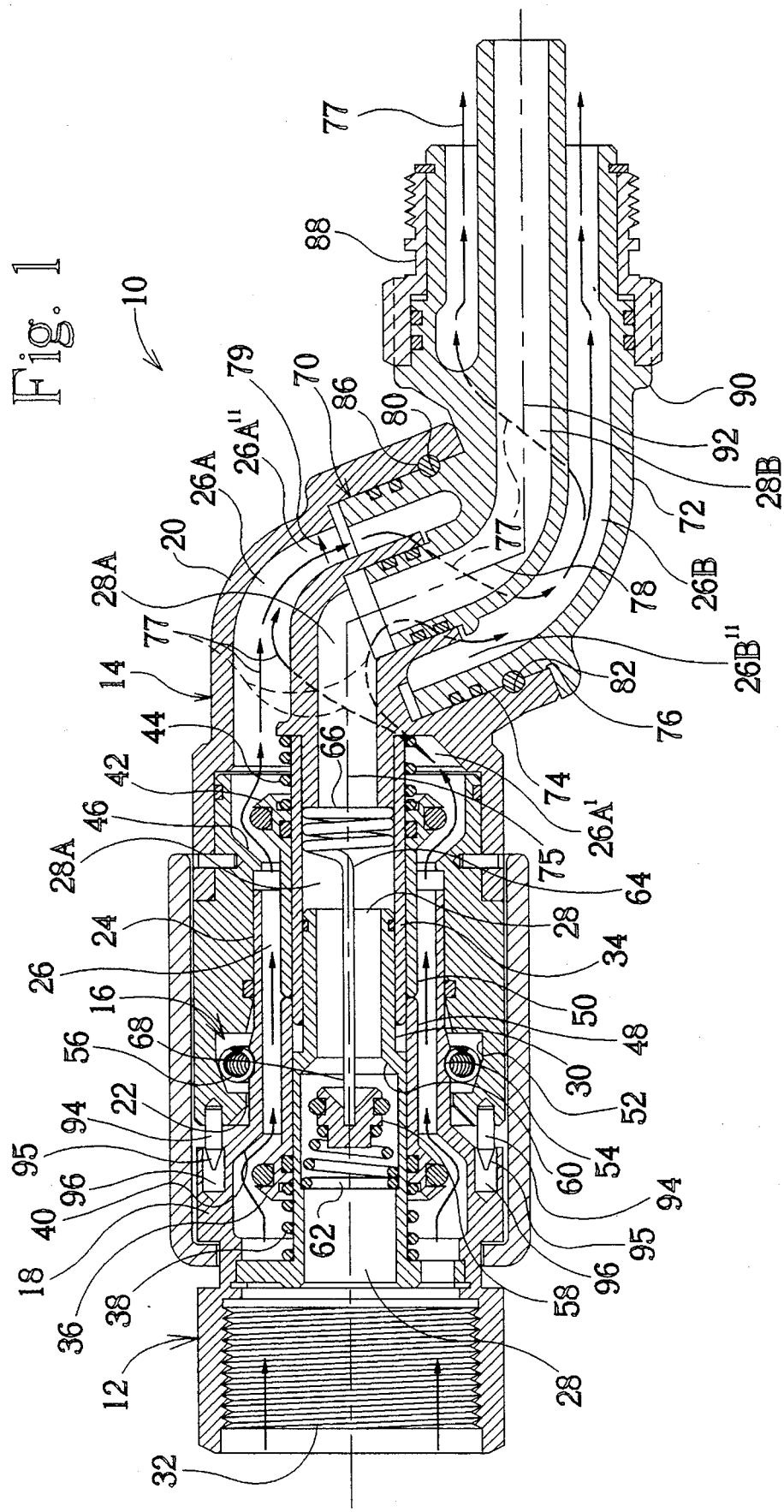
FIG. 1 illustrates a side elevation view, in section, of a breakaway hose coupling of the present invention.

The breakaway hose coupling 10 generally comprises first and second valve assemblies 12 and 14, respectively, and a disconnect mechanism 16 for releasably joining the valve assemblies 12 and 14 in the absence of axial disengaging force in excess of a preselected value and for releasing the valve assemblies 12 or 14 in response to axial disengaging force in excess of a preselected value. As illustrated in FIG. 1 the first and second valve assemblies 12 and 14 include first and second valve housings 18 and 20, respectively, with the valve housing 20 defining a forwardly disposed receptor 22 for slidably receiving the forward portion 24 of the valve housing 18.

The housing 18 defines both a liquid passageway 26 therethrough and a vapor passageway 28 therethrough, with the passageways 26 and 28 being substantially coaxial in the preferred embodiment, with the liquid passageway 26 jacketing or surrounding the vapor passageway 28. More specifically, in the preferred embodiment the housing 18 includes a sleeve member 30 which is mounted within the housing 18 and defines the vapor passageway 28. Further, the rearward portion of the housing 18 is provided with a releasable connecting mechanism, such as the illustrated threaded receptor 32, for releasably engaging a hose end or directly engaging a nozzle, pump, or other dispensing device so as to place such device in fluid communication with the passageways 26 and 28.

The second housing 20 defines both a liquid passageway 26A therethrough and a vapor passageway 28A therethrough, with the passageways 26A and 28A being substantially coaxial in the preferred embodiment, with the liquid passageway 26A surrounding the vapor passageway 28A. As illustrated in FIG. 1, the passageways 26A and 28A are disposed such that they are in fluid communication with the passageways 26 and 28, respectively, of the housing 18 as the forward portion 24 of the housing 18 is received in the receptor 22 of the housing 20. In this regard, in the preferred embodiment the housing 20 is provided with a sleeve 34 which defines at least a portion of the passageway 28A, and which releasably received the forward portion of the sleeve 30 of the first housing 18 in order to establish fluid communication between the passageways 28 and 28A.

In order to automatically seal the passageways 26 and 26A when the valve housings 18 and 20 disconnect, each of the valve assemblies 12 and 14 is provided with a valve mechanism disposed within the operatively associated passageway 26, 26A. In this regard, the valve mechanism of the housing 18 includes a first poppet valve 36 which defines an opening therethrough such that the valve 36 is slidably received over the sleeve 30. A spring member 38, also slidably received over the sleeve 30, is provided for biasing the valve 36 toward a valve seat 40 which is defined by the housing 18 within the passageway 26. Thus, it will be recognized that when the valve 36 is seated against the valve seat 40 the flow of liquid through the passageway 26 is terminated. Similarly, the valve mechanism of the housing 20 includes a second poppet valve 42 which defines an opening therethrough such that the valve 42 is slidably received over the sleeve 34. A spring member 44, also slidably received over the sleeve 34, is provided for biasing the valve 42 toward a valve seat 46 which is defined by the housing 20 within the passageway 26A. Thus, it will be recognized that when the valve 42 is seated against the valve seat 46 the flow of liquid through the passageway is terminated.

In order to place the valves 36 and 42 in an open position when the housings 18 and are in a coupled disposition, the valve 36 is provided with an elongated forward end portion 48 which releasably engages an elongated forward end portion 50 of the valve 42. The combined lengths of the forward end portions 48 and 50 are preselected such that the engagement of the forward end portions 48 and 50 maintains the valves 36 and 42 in open positions against the bias of the operatively associated spring members 38 and 44 when the forward portion 24 of the housing 18 is seated in the receptor 22 of the housing 20. However, when the forward portion 24 disengages from the receptor 22, the forward end portions 48 and 50 of the valves 36 and 42, respectively, disengage allowing the valves 36 and 42 to seat against their operatively associated valve seats 40 and thereby closing both valve housings 18 and 20 to the flow of liquid prior to the seal between the housing 18 and 20 being broken.

As indicated above, the disconnect mechanism 16 serves as a mechanism for automatically disconnecting the housings 18 and 20 when disengaging force in excess of a preselected value is applied to the coupling 10. In this regard, in the preferred illustrated embodiment an annular groove 52 is provided in the receptor 22 and a registering annular groove 54 is provided in the housing 18 so as to circumscribe the housing 18. The mechanism 16 includes a circular canted-coil spring 56 which is mounted in the registering grooves 52 and 54, and which serves to releasably hold the housing 18 in the receptor 22 during normal operation. However, when disengaging force in excess of a preselected value is applied to the coupling 10, the forward portion of the wall of the groove 54 applies the load across the spring 56 to the groove 52, thereby compressing the spring 56 and allowing the valve housings to disconnect. Of course, the force necessary to effect disengagement can be preselected by selecting the appropriate canted-coil spring 56 and by selectively dimensioning the grooves 52 and 54.

In order to automatically seal the vapor passageway 28 when the housings 18 and 20 disconnect a further valve mechanism is provided. This further valve mechanism includes a third popper valve 58 which is mounted in the passageway 28 and which seals the passageway 28 as it engages a valve seat 60 defined by the sleeve 30 within the passageway 28. In the preferred embodiment a spring member 62 is mounted in the passageway 28 for biasing the valve 58 toward the valve seat 60, with the spring member 62 also serving as a mounting member for holding the valve 60 in a substantially axial position within the passageway 28.

In order to hold the valve 58 in an open position while the housings 18 and 20 are coupled, a spring actuator member 64 is provided. In the preferred embodiment the actuator member 64 defines a spring portion 66 which is mounted in the passageway 28A of the housing 20 and a stem portion 68 which extends into the passageway 28 and releasably engages the valve 58 and displaces the valve 58 from the valve seat 60 when the housings 18 and 20 are coupled. When the housings 18 and 20 disengage, the stem portion 68 of the actuator member 64 disengages from the valve 58 and the valve 58 is allowed to seat against the valve seat 60, thereby terminating the flow of vapor though the passageway.

Figure 3:
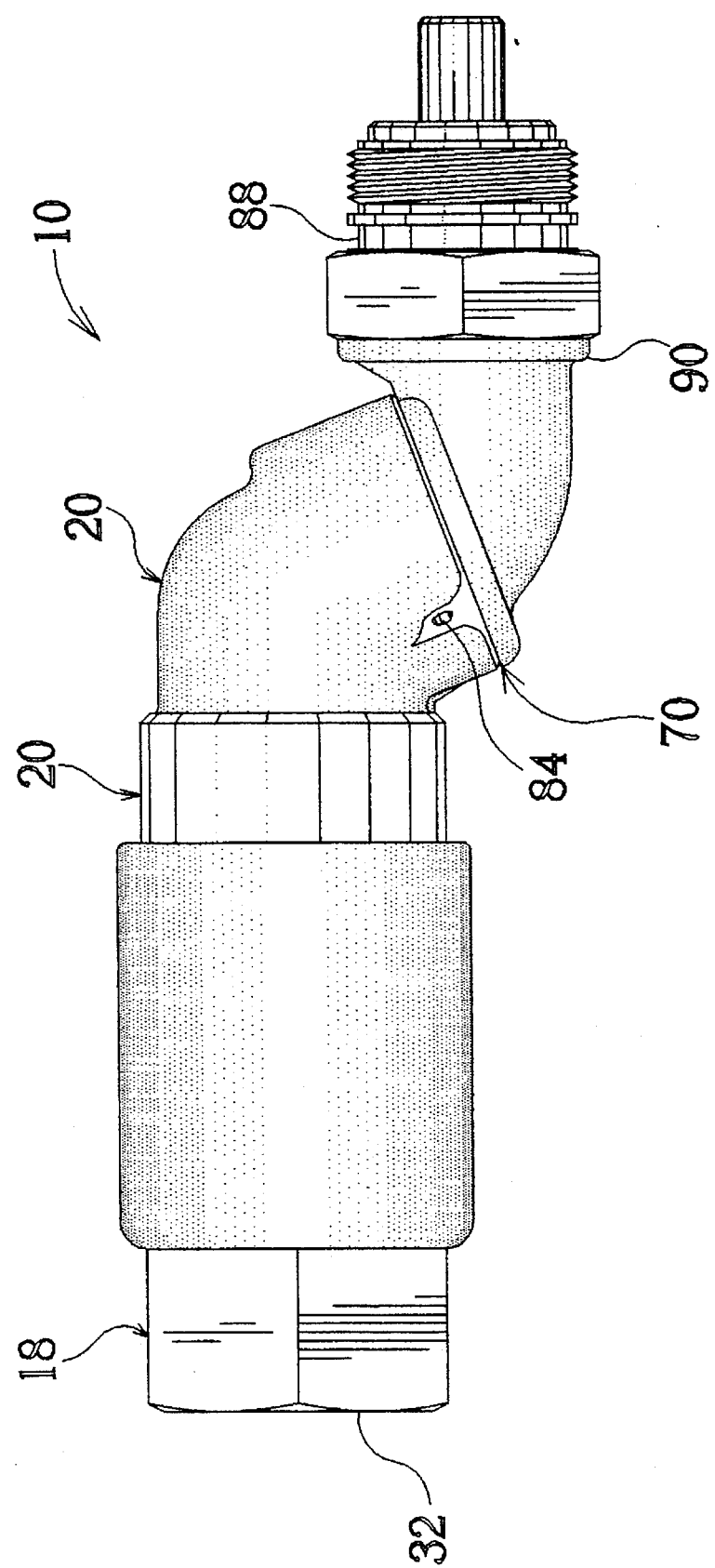
FIG. 3 illustrates a side elevation view of a breakaway hose coupling of the present invention.

The second valve assembly 14 also includes a swivel mechanism which is generally illustrated at 70 in the FIGS. 1 and 3. The mechanism 70 includes an elbow 72 which defines both a liquid passageway 26B therethrough and a vapor passageway 28B therethrough, with the passageways 26B and 28B being substantially coaxial in the preferred embodiment, with the liquid passageway 26B surrounding the vapor passageway 28B. As illustrated in FIG. 1, the passageways 26B and 28B are disposed such that they are in fluid communication with the passageways 26A and 28A, respectively, of the housing 20 when the elbow 72 is coupled with the housing 20. In this regard, the elbow 72 has a first end portion 74 which is rotatably received in an annular receptor 76 defined by the housing 20. Further, the first end portion 74 of the elbow 72, and the receptor 76 of the housing 20, are aligned on an axis which is at a preselected angle relative to a primary axis 75 on which the receptor 22 of the housing 20, and the poppet valves 36 and 42, are oriented. Accordingly, when the first end portion 74 of the elbow is rotated in the receptor 76, the elbow 72 swivels about a secondary axis 78 which is inclined with respect to the primary axis 75 to allow up to and in excess of 360° rotation.

Figure 2:
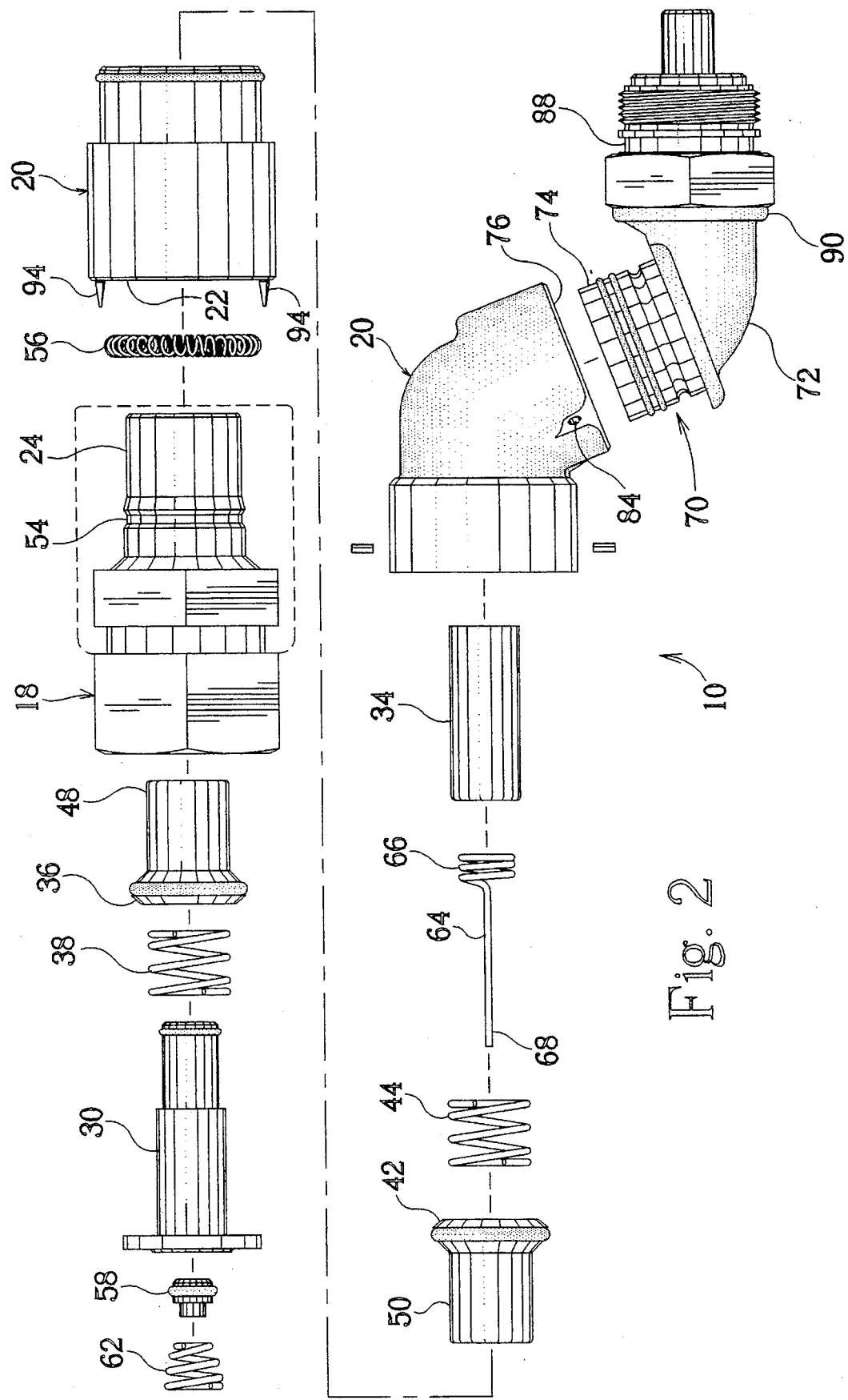
FIG. 2 illustrates an exploded side elevation view of a breakaway hose coupling of the present invention.

The swivel mechanism 70 also includes a mechanism for rotatably locking the first end portion 74 of the elbow in the receptor 76. In this regard, in the preferred embodiment the first end portion 74 of the elbow and the receptor 76 of the housing 20 are provided with registering annular grooves 80 and 82, respectively, which cooperatively define an annular channel circumscribing the first end portion 74 of the elbow. Further, as best illustrated in FIG. 2, the housing 20 defines a further channel 84 which provides access into the channel formed by the grooves 80 and 82. A flexible rod 86 having a substantially circular cross-section is inserted into the channel 84, and into the channel formed by the grooves 80 and 82. Preferably the rod 86 is fabricated of nylon or some other strong, durable resilient material. Thus, as will be recognized by those skilled in the art, when seated in the grooves 80 and 82, the rod 86 prohibits the first end portion 74 from being removed from the receptor 76, and also serves as a bearing to facilitate the rotational engagement of the elbow 72 and the valve housing 20.

Of course, the above-described locking mechanism represents only one suitable mechanism for rotatably locking the first end portion 74 of the elbow 72 in the receptor 76, and other suitable mechanisms can be used if desired.

With respect to the fluid communication between the valve housing 20 and the elbow 72, it will be noted that in the preferred embodiment there is no direct communication between the lower portion $26A^1$ of the liquid passageway 26A and the outer radial portion $26B^{11}$ of the liquid passageway 26B of the elbow 72. Whereas the liquid passageway encircles the vapor passageway 28A up to a point proximate the receptor 76, thereafter fuel flow is routed toward the outer radial portion $26A^{11}$ of the arcuate section of the liquid passageway 26A and into the liquid passageway 26B, as illustrated by the flow lines 77 in FIG. 1. This diversion of the liquid flow to the outer radial portion $26A^{11}$ of the liquid passageway 26A allows the housing 20 and the elbow 72 to rotatably engage with minimal lateral displacement between their respective axes 75 and 92. It will also be noted that the passageway 28A is concentric with the fuel passageway 26A for most of its length, but is offset toward the outer radial portion $26A^{11}$ proximate the point at which the housing 20 and the elbow 72 engage (see arrow 79) so as to further facilitate a minimal lateral displacement between the axes of the housing 20 and the elbow 72.

The elbow 72 is also provided with a securing mechanism for rotatably connecting the elbow 72 to a hose, nozzle, pump, or other dispensing device, such that the passageways 26B and 28B are in fluid communication with such device. In the preferred embodiment such mechanism includes a threaded collar 88 rotatably mounted on a second end portion 90 of the elbow 72 and which is threadably received in a threaded receptor (not shown) provided in the dispensing device. In view of the rotational mounting of the collar 88 on the elbow 72, axial rotation of the coupling 10 with respect to the dispensing device secured to the collar 88 is accommodated, with the associated rotational axis 92 being inclined relative to the secondary axis 78 about which the first end portion 74 of the elbow 72 rotates. It will, however, be recognized that other suitable mechanisms can be used to releasably connect the elbow 72 with a dispensing device, and the illustrated collar 88 is merely illustrative of one preferred mechanism.

In the preferred embodiment, the coupling 10 is also provided with a mechanism for prohibiting rotation of the housing 18 with respect to the housing 20. Such rotation can undermine the seals between the housing 18 and the walls of the receptor 22 and otherwise disrupt the operation of the disconnect mechanism 16. Moreover, given the rotational engagement of the second end portion 90 of the elbow 72 with an operatively associated dispensing device, it is not necessary to provide for rotation between the housings 18 and 20.

In the preferred embodiment, the mechanism for prohibiting rotation of the housing 18 with respect to the housing 20 includes one or more pins 94 which extend between the housings 18 and 20 when they are in a coupled disposition. More specifically, in the preferred embodiment the pins 94 are mounted in the housing 20 and are releasably received in registering receptors 96 provided in the housing 18. It will, however, be recognized that the pins 94 can be mounted in the housing 18, with the receptors 96 being provided in the housing 20, in order to prevent rotation of the housings 18 and 20 relative to one another. In the preferred embodiment the pins 94 define distal end portions having tapered sides 95 to allow rotation as the valve assemblies 12 and 14 disengage under the preselected disengaging force. It will also be recognized that other suitable mechanisms for prohibiting rotation can be used if desired.

In light of the above it will be recognized that the present invention provides an improved breakaway hose coupling having great advantages over the prior art. The coupling 10 automatically disengages in response to disengaging force in excess of a preselected value. When disengaged the coupling 10 terminates the flow of fuel and fuel vapor from the hose end or dispensing device to which the housing 18 is secured and terminates the flow of fuel from the hose or dispensing device to which the housing 20, through the elbow 72, is connected. Moreover, the coupling 10 allows the dispensing devices which are coupled to be rotated with respect to one another about two different axes, without compromising the operation of the disconnect mechanism or the integrity of the seals disposed between the valve housings 18 and 20. However, while a preferred embodiment has been shown and described, it will be understood that there is no intent to limit the invention to such disclosure, but rather it is intended to cover all modifications and alternate constructions falling within the spirit and scope of the invention as defined in the appended claims.

I claim:

1. A breakaway hose coupling for releasably joining first and second fuel dispensing devices in fluid communication, said coupling comprising:

a first valve assembly, including (A) a first valve housing for being releasably secured to, and being placed in flow-through fluid communication with, a first dispensing device, said first valve housing being provided with a fuel passageway therethrough in fluid communication with the first dispensing device when said first valve housing is secured to the first dispensing device, and being provided with a vapor passageway therethrough in fluid communication with the first dispensing device when said first valve housing is secured to the first dispensing device, said fuel passageway and said vapor passageway being substantially coaxially disposed, with said fuel passageway jacketing said vapor passageway;

(B) a first valve mechanism including a first valve member mounted in said fuel passageway of said first valve housing for selectively terminating the flow of fuel through said fuel passageway of said first valve housing, said first valve member being aligned on a first axis;

(C) a further valve mechanism including a further valve member mounted in said vapor passageway of said first valve housing for selectively terminating the flow of fuel vapor through said vapor passageway of said first valve housing;

a second valve assembly including (A) a second valve housing for being placed in flow-through fluid communication with a second dispensing device, said second valve housing being releasably engagable with said first valve housing placing said second valve housing in fluid communication with said first valve housing, said second valve housing being provided with a fuel passageway therethrough in fluid communication with the second dispensing device and said fuel passageway of said first valve housing, and provided with a vapor passageway therethrough in fluid communication with the second dispensing device and said vapor passageway of said first valve housing, said fuel passageway of said second valve housing and said vapor passageway of said second valve housing being substantially coaxially disposed, with said fuel passageway of said second valve housing jacketing said vapor passageway of said second valve housing, said second valve housing defining a first end portion for engaging said first valve housing and an arcuate second end portion defining an annular receptor aligned on a second axis inclined with respect to said first axis, said fuel passageway of said second valve housing being disposed so as to encircle said vapor passageway of said second valve housing from said first end portion of said first valve housing up to a point proximate said annular receptor of said second valve housing and thereafter constricting into a non-encircling outer radial portion;

(B) a second valve mechanism including a second valve member mounted in said fuel passageway of said second housing for selectively terminating the flow of fuel through said fuel passageway of said second housing when said first and second valve housings are disengaged;

(C) an elbow establishing flow-through fluid communication between the second dispensing device and said second valve housing, said elbow being provided with a fuel passageway therethrough in fluid communication with the second dispensing device and said fuel passageway of said second valve housing, and provided with a vapor passageway therethrough in fluid communication with the second dispensing device and said vapor passageway of said second valve housing, said fuel passageway of said elbow and said vapor passageway of said elbow being substantially coaxially disposed, with said fuel passageway of said elbow jacketing said vapor passageway of said elbow, said elbow defining a first end portion for being rotatably received in said annular receptor of said second housing placing said fuel passageway of said elbow in fluid communication with said non-encircling outer radial portion of said fuel passageway of said second valve housing;

(D) a swivel connecting mechanism pivotally securing said elbow to said second valve housing whereby said elbow selectively swivels with respect to said second valve housing on said second axis; and an automatic disconnect mechanism selectively maintaining said first and second valve housings in an engaged position, and selectively disengaging said first and second valve housings, whereby said first and second valve mechanisms terminate the flow of fuel through said first and second valve housings, respectively, and said further valve mechanism terminates the flow of fuel vapor through said first valve housing, upon the disengaging of said first and second valve housings.

2. The breakaway hose coupling of claim 1 wherein said elbow defines a second end portion provided with a securing mechanism for releasably and rotatably engaging the second dispensing device whereby said elbow is rotatable relative to the second dispensing device about a third axis, said third axis being inclined relative to said second axis.

3. The breakaway hose coupling of claim 2 wherein said securing mechanism for releasably and rotatably engaging the second dispensing device includes a threaded collar rotatably mounted on said second end portion of said elbow for threadably engaging the second dispensing device.

4. The breakaway hose coupling of claim 3 wherein said coupling includes a mechanism for prohibiting the rotation of said first valve housing relative to said second valve housing when said first and second valve housings are coupled.

5. The breakaway hose coupling of claim 4 wherein said first valve housing includes a sleeve member which is mounted therein, said sleeve member defining therein at least a portion of said vapor passageway of said first valve housing, and wherein said second valve housing includes a further sleeve member which is mounted therein, said further sleeve member defining therein at least a portion of said vapor passageway of said second valve housing, said further sleeve member having a forward end portion releasably engaging said sleeve member of said first valve housing when said first valve housing is releasably engaged with said second valve housing establishing fluid communication between said vapor passageway of said first valve housing and said vapor passageway of said second valve housing.

6. The breakaway hose coupling of claim 5 wherein said first valve housing defines a first valve seat within said fuel passageway of said first valve housing, and wherein said first valve member defines a first poppet valve provided with an axially disposed opening therethrough for slidably receiving said sleeve member of said first valve housing, said first valve mechanism further including a first spring member for biasing said first poppet valve into engagement with said first valve seat.

7. The breakaway hose coupling of claim 6 wherein said second valve housing defines a second valve seat within said fuel passageway of said second valve housing, and wherein said second valve member defines a second poppet valve provided with an axially disposed opening therethrough for slidably receiving said further sleeve member of said second valve housing, said second valve mechanism further including a second spring member for biasing said second poppet valve into engagement with said second valve seat.

8. The breakaway hose coupling of claim 7 wherein said first poppet valve is provided with an elongated forward portion of selected length defining an outboard end and said second poppet valve is provided with an elongated forward portion of selected length defining an outboard end for engaging said outboard end of said elongated forward portion of said first poppet valve, whereby said first and second poppet valves are held in an open position when said first and second valve housings are engaged.

9. The breakaway hose coupling of claim 8 wherein said sleeve member of said first valve housing defines a valve seat within said vapor passageway of said first valve housing, and wherein said further valve member defines a third poppet valve mounted with in said vapor passageway and said further valve mechanism includes a spring member for biasing said third poppet valve toward said valve seat of said sleeve member, said further valve mechanism further including an actuator member mounted in said second valve housing for releasably engaging said third poppet valve whereby said third poppet valve is maintained in an open position when said first and second housings are in a coupled position.

10. The breakaway hose coupling of claim 9 wherein said actuator member defines a spring portion mounted in said vapor passageway of said second valve housing and a stem portion which extends into the vapor passageway of said first valve housing to releasably engage said third poppet valve.

11. The breakaway hose coupling of claim 1 wherein said vapor passageway of said second valve housing is concentrically disposed relative to said liquid passageway of said second valve housing from said first end portion of said second valve housing to a point proximate said annular receptor of said second valve housing, and defines an outboard portion which is offset toward said outer radial portion of said liquid passageway of said second valve housing for communicating with said vapor passageway of said elbow.

12. A breakaway hose coupling for releasably joining first and second fuel dispensing devices in fluid communication, said coupling comprising:

a first valve assembly, including (A) a first valve housing for being secured to, and being placed in flow-through fluid communication with, a first dispensing device, said first valve housing being provided with a fuel passageway therethrough in fluid communication with the first dispensing device, and being provided with a vapor passageway therethrough in fluid communication with the first dispensing device, said fuel passageway and said vapor passageway being substantially coaxially disposed, with said fuel passageway jacketing said vapor passageway;

(B) a first valve mechanism including a first valve member mounted in said fuel passageway of said first valve housing for selectively terminating the flow of fuel through said fuel passageway of said first valve housing, said first valve member being aligned on a first axis;

(C) a further valve mechanism including a further valve member mounted in said vapor passageway of said first valve housing for selectively terminating the flow of fuel vapor through said vapor passageway of said first valve housing;

a second valve assembly including (A) a second valve housing for being placed in flow-through fluid communication with a second dispensing device, said second valve housing being releasably engagable with said first valve housing placing said second valve housing in fluid communication with said first valve housing, said second valve housing being provided with a fuel passageway therethrough in fluid communication with the second dispensing device and said fuel passageway of said first valve housing, and provided with a vapor passageway therethrough in fluid communication with the second dispensing device and said vapor passageway of said first valve housing, said fuel passageway of said second valve housing and said vapor passageway of said second valve housing being substantially coaxially disposed, with said fuel passageway of said second valve housing jacketing said vapor passageway of said second valve housing, said second valve housing defining a first end portion releasably engaging said first valve housing and an arcuate second end portion, said fuel passageway of said second valve housing being disposed so as to encircle said vapor passageway of said second valve housing from said first end portion of said second valve housing up to a point proximate said second end portion of said second valve housing and thereafter constricting into a non-encircling outer radial portion;

(B) a second valve mechanism including a second valve member mounted in said fuel passageway of said second housing for selectively terminating the flow of fuel through said fuel passageway of said second housing when said first and second valve housings are disengaged;

(C) an elbow establishing flow-through fluid communication between the second dispensing device and said second valve housing, said elbow being provided with a fuel passageway therethrough in fluid communication with the second dispensing device and said fuel passageway of said second valve housing, and provided with a vapor passageway therethrough in fluid communication with the second dispensing device and said vapor passageway of said second valve housing, said fuel passageway of said elbow and said vapor passageway of said elbow being substantially coaxially disposed, with said fuel passageway of said elbow jacketing said vapor passageway of said elbow, said elbow defining a first end portion for rotatably engaging said second end portion of said second housing placing said fuel passageway of said elbow in fluid communication with said non-encircling outer radial portion of said fuel passageway of said second valve housing;

(D) a swivel connecting mechanism pivotally securing said elbow to said second valve housing such that said elbow selectively swivels with respect to said second valve housing on a second axis inclined with respect to said first axis; and an automatic disconnect mechanism selectively maintaining said first and second valve housings in an engaged position, and selectively disengaging said first and second valve housings, whereby said first and second valve mechanisms terminate the flow of fuel through said first and second valve housings, respectively, and said further valve mechanism terminates the flow of fuel vapor through said first valve housing, upon the disengaging of said first and second valve housings.

13. A breakaway hose coupling for releasably joining first and second fuel dispensing devices in fluid communication, said coupling comprising:

a first valve assembly, including a first valve housing for being releasably secured to, and being placed in flow-through fluid communication with, a first dispensing device, said first valve housing being provided with a fuel passageway therethrough in fluid communication with the first dispensing device, and being provided with a vapor passageway therethrough in fluid communication with the first dispensing device, said fuel passageway and said vapor passageway being substantially coaxially disposed, with said fuel passageway jacketing said vapor passageway, said first valve housing defining a first valve seat within said fuel passageway, said first valve housing including a first sleeve member which is mounted therein, said first sleeve member defining therein at least a portion of said vapor passageway of said first valve housing, said first valve assembly also including a first valve mechanism including a first valve member mounted in said fuel passageway of said first valve housing for selectively terminating the flow of fuel through said fuel passageway of said first valve housing, said first valve member being aligned on a first axis, said first valve member defining a poppet valve provided with an axially disposed opening therethrough which slidably receives therethrough said first sleeve member, said first valve mechanism further including a first spring member for biasing said first poppet valve into engagement with said first valve seat;

a second valve assembly including a second valve housing for being placed in flow-through fluid communication with a second dispensing device, said second valve housing being releasably engagable with said first valve housing placing said second valve housing in fluid communication with said first valve housing, said second valve housing being provided with a fuel passageway therethrough in fluid communication with the second dispensing device and said fuel passageway of said first valve housing, and provided with a vapor passageway therethrough in fluid communication with the second dispensing device and said vapor passageway of said first valve housing, said fuel passageway of said second valve housing and said vapor passageway of said second valve housing being substantially coaxially disposed, with said fuel passageway of said second valve housing jacketing said vapor passageway of said second valve housing, said second valve housing defining a second valve seat, said second valve housing including a second sleeve member which is mounted therein, said second sleeve member defining therein at least a portion of said vapor passageway of said second valve housing, said second sleeve member having a forward end portion releasably engaging a forward end portion of said first sleeve member so as to establish fluid communication between said vapor passageway of said first valve housing and said vapor passageway of said second valve housing, said second valve assembly also including a second valve mechanism including a second valve member mounted in said fuel passageway of said second housing for selectively terminating the flow of fuel through said fuel passageway of said second housing when said first and second valve housings are disengaged, said second valve member defining a second poppet valve provided with an axially disposed opening therethrough which slidably receives therethrough said second sleeve member, said second valve mechanism further including a second spring member biasing said second poppet valve into engagement with said second valve seat; and disconnect means for selectively maintaining said first and second valve housings in an engaged position, and for selectively disengaging said first and second valve housings.

14. A breakaway hose coupling for releasably joining first and second fuel dispensing devices in fluid communication, said coupling comprising:

a first valve assembly, including a first valve housing for being releasably secured to, and being placed in flow-through fluid communication with, a first dispensing device, said first valve housing being provided with a fuel passageway therethrough in fluid communication with the first dispensing device, and being provided with a vapor passageway therethrough in fluid communication with the first dispensing device, said fuel passageway and said vapor passageway being substantially coaxially disposed, with said fuel passageway jacketing said vapor passageway, said first valve housing defining a first valve seat within said fuel passageway, said first valve housing including a first sleeve member which is mounted therein, said first sleeve member defining therein at least a portion of said vapor passageway of said first valve housing, said first valve assembly also including a first valve mechanism including a first valve member mounted in said fuel passageway of said first valve housing for selectively terminating the flow of fuel through said fuel passageway of said first valve housing, said first valve member being aligned on a first axis, said first valve member defining a poppet valve provided with an axially disposed opening therethrough which slidably receives therethrough said first sleeve member, said first valve mechanism further including a first spring member biasing said first poppet valve into engagement with said first valve seat, said first valve assembly further including a further valve mechanism including a further valve member mounted in said vapor passageway of said first valve housing for selectively terminating the flow of fuel vapor through said vapor passageway of said first valve housing;

a second valve assembly including a second valve housing for being placed in flow-through fluid communication with a second dispensing device, said second valve housing being releasably engagable with said first valve housing for placing said second valve housing in fluid communication with said first valve housing, said second valve housing being provided with a fuel passageway therethrough for in fluid communication with the second dispensing device and said fuel passageway of said first valve housing, and provided with a vapor passageway therethrough in fluid communication with the second dispensing device and said vapor passageway of said first valve housing, said fuel passageway of said second valve housing and said vapor passageway of said second valve housing being substantially coaxially disposed, with said fuel passageway of said second valve housing jacketing said vapor passageway of said second valve housing, said second valve housing defining a second valve seat, said second valve housing including a second sleeve member which is mounted therein, said second sleeve member defining therein at least a portion of said vapor passageway of said second valve housing, said second sleeve member having a forward end portion releasably engaging a forward portion of said first sleeve member so as to establish fluid communication between said vapor passageway of said first valve housing and said vapor passageway of said second valve housing, said second valve assembly also including a second valve mechanism including a second valve member mounted in said fuel passageway of said second housing for selectively terminating the flow of fuel through said fuel passageway of said second housing when said first and second valve housings are disengaged, said second valve member defining a second poppet valve provided with an axially disposed opening therethrough which slidably receives therethrough said second sleeve member, said second valve mechanism further including a second spring member biasing said second poppet valve into engagement with said second valve seat; and disconnect means for selectively maintaining said first and second valve housings in an engaged position, and for selectively disengaging said first and second valve housings.

15. The breakaway hose coupling of claim 14 wherein said first poppet valve is provided with an elongated forward portion of selected length defining an outboard end and said second poppet valve is provided with an elongated forward portion of selected length defining an outboard end for engaging said outboard end of said elongated forward portion of said first poppet valve, whereby said first and second poppet valves are held in an open position when said first and second valve housings are engaged.

16. The breakaway hose coupling of claim 14 wherein said sleeve member of said first valve housing defines a valve seat within said vapor passageway of said first valve housing, and wherein said further valve member defines a third poppet valve mounted with in said vapor passageway and said further valve mechanism includes a spring member for biasing said third poppet valve toward said valve seat of said sleeve member, said further valve mechanism further including an actuator member mounted in said second valve housing for releasably engaging said third poppet valve whereby said third poppet valve is maintained in an open position when said first and second housings are in a coupled position.

17. The breakaway hose coupling of claim 16 wherein said actuator member defines a spring portion mounted in said vapor passageway of said second valve housing and a stem portion which extends into the vapor passageway of said first valve housing to releasably engage said third poppet valve.

* * * * *